Dec. 19, 1939.　　　M. A. SOENENS　　　2,183,946
MACHINE FOR PULLING STANDING FLAX OR OTHER LIKE PLANTS
Filed July 23, 1937　　　6 Sheets-Sheet 1
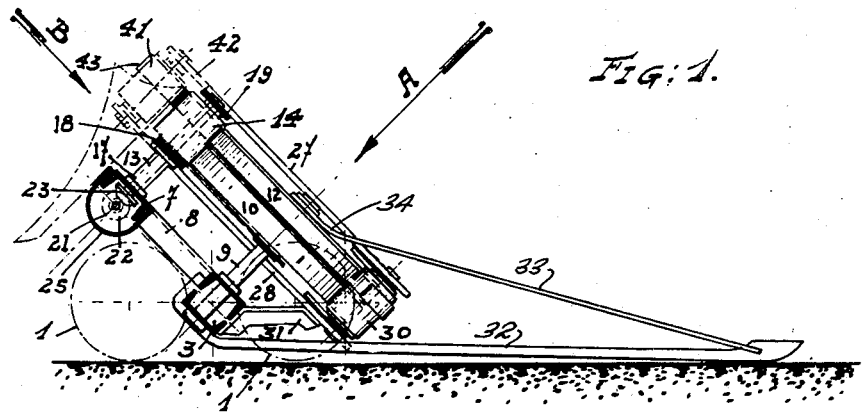
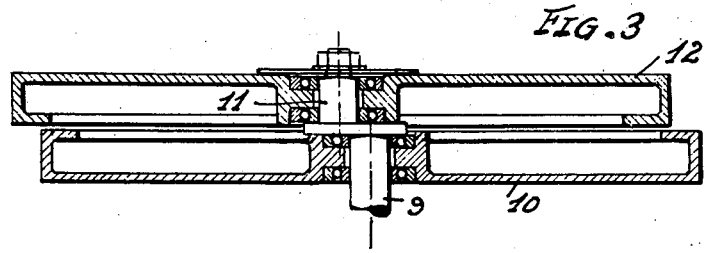
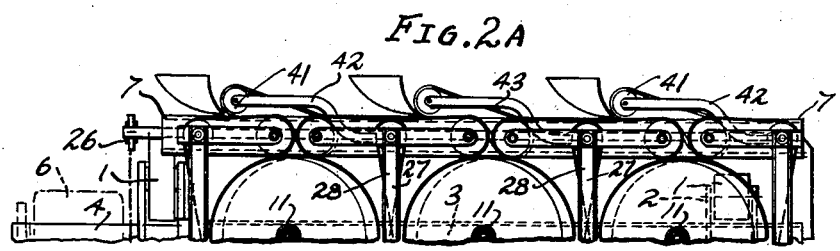
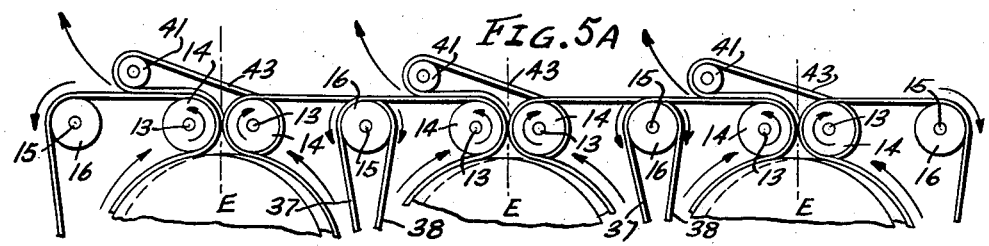
Maurice Alois Soenens
INVENTOR
his ATTY.

Dec. 19, 1939.  M. A. SOENENS  2,183,946
MACHINE FOR PULLING STANDING FLAX OR OTHER LIKE PLANTS
Filed July 23, 1937  6 Sheets-Sheet 2
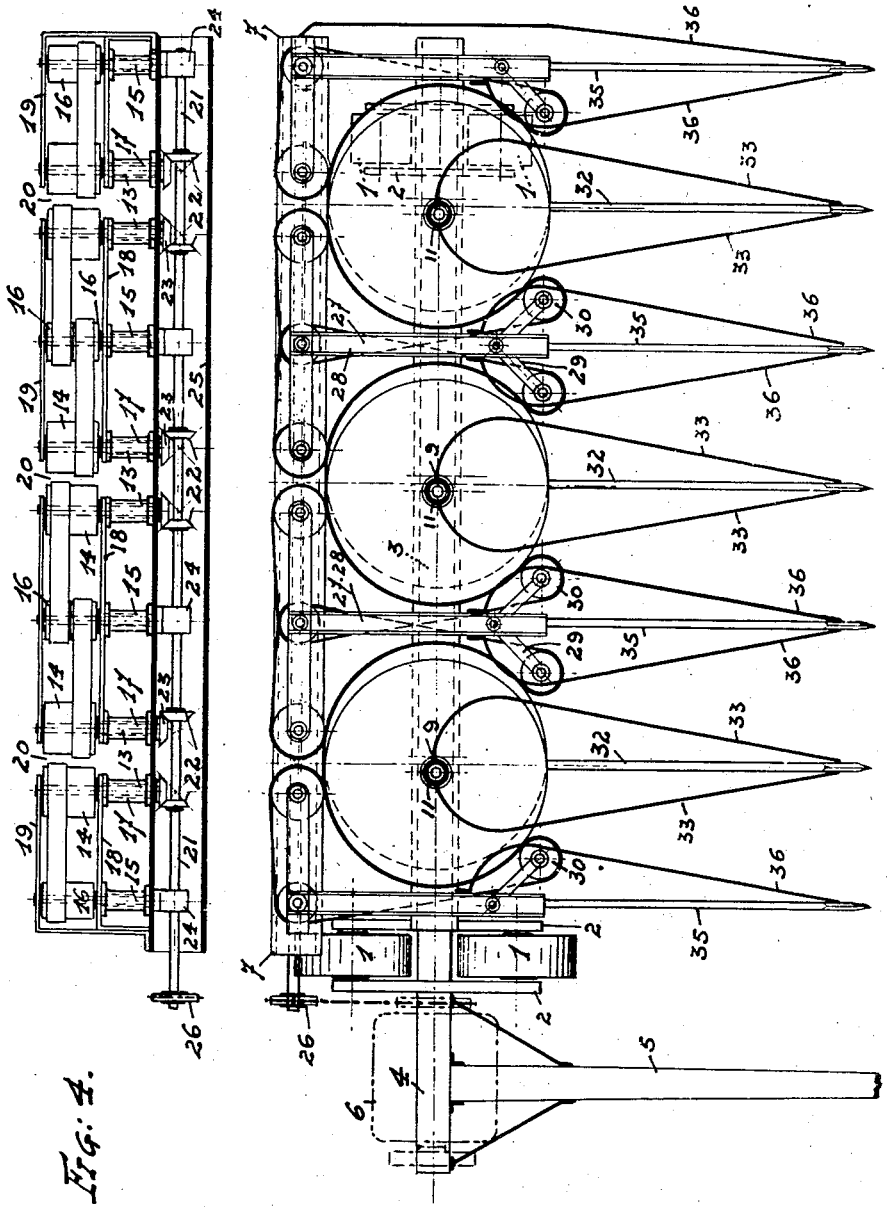
Maurice Alois Soenens
INVENTOR
his ATTY.

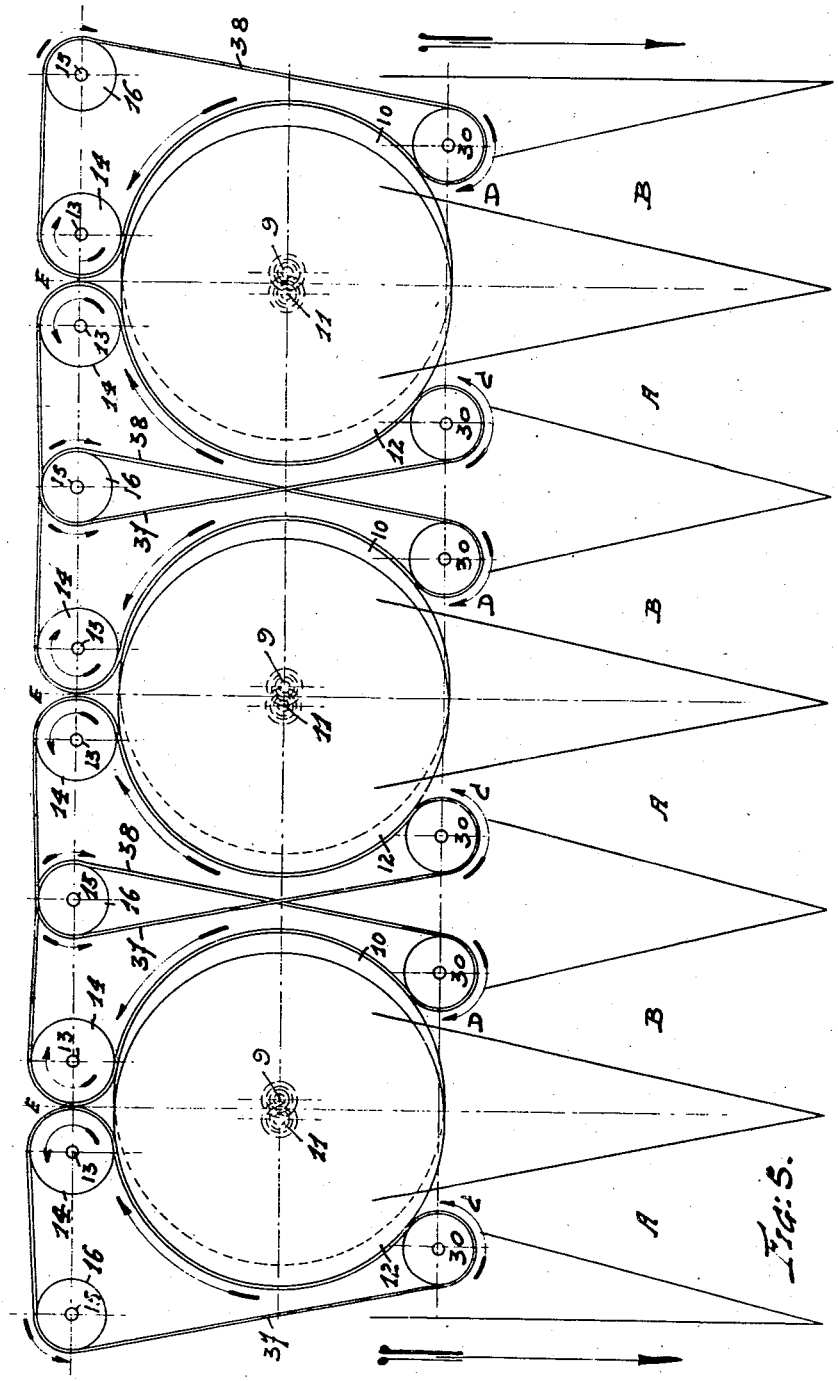

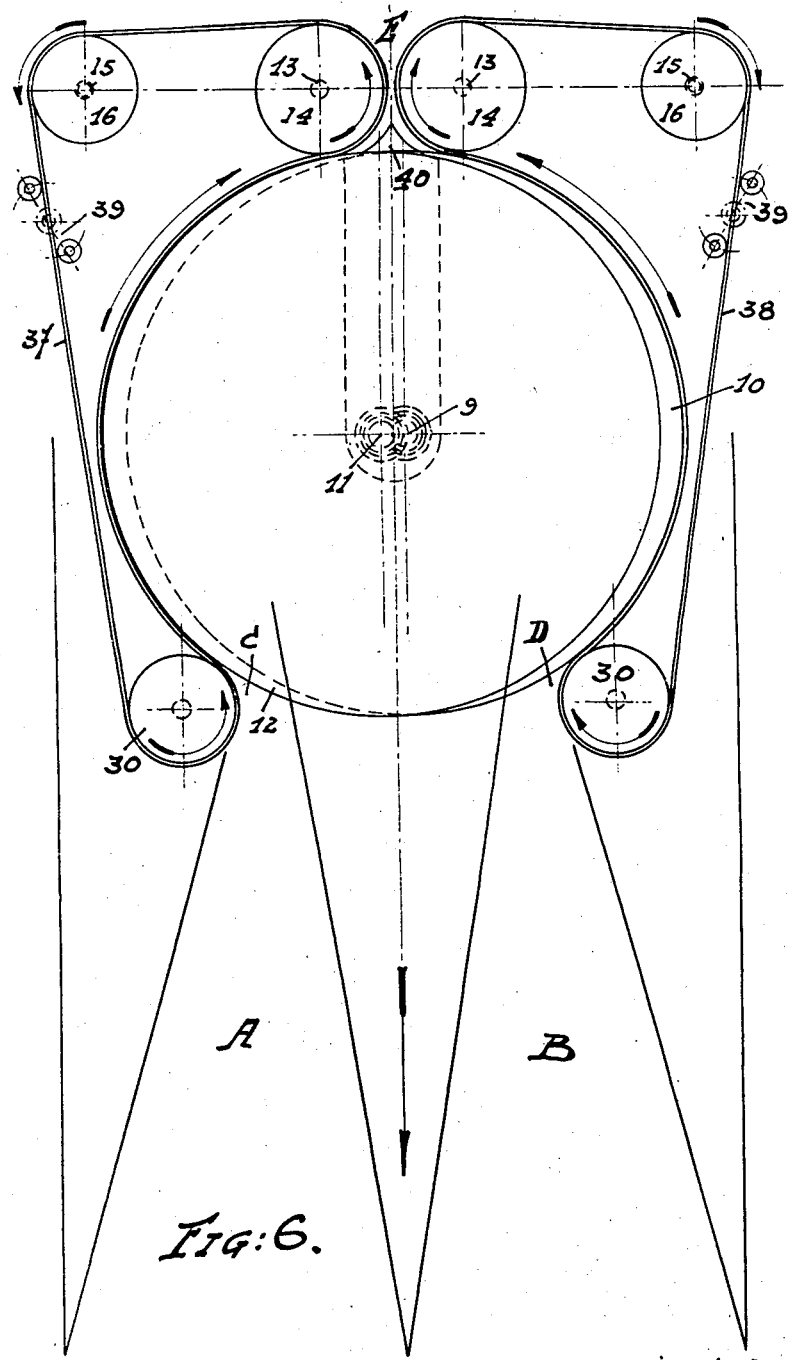

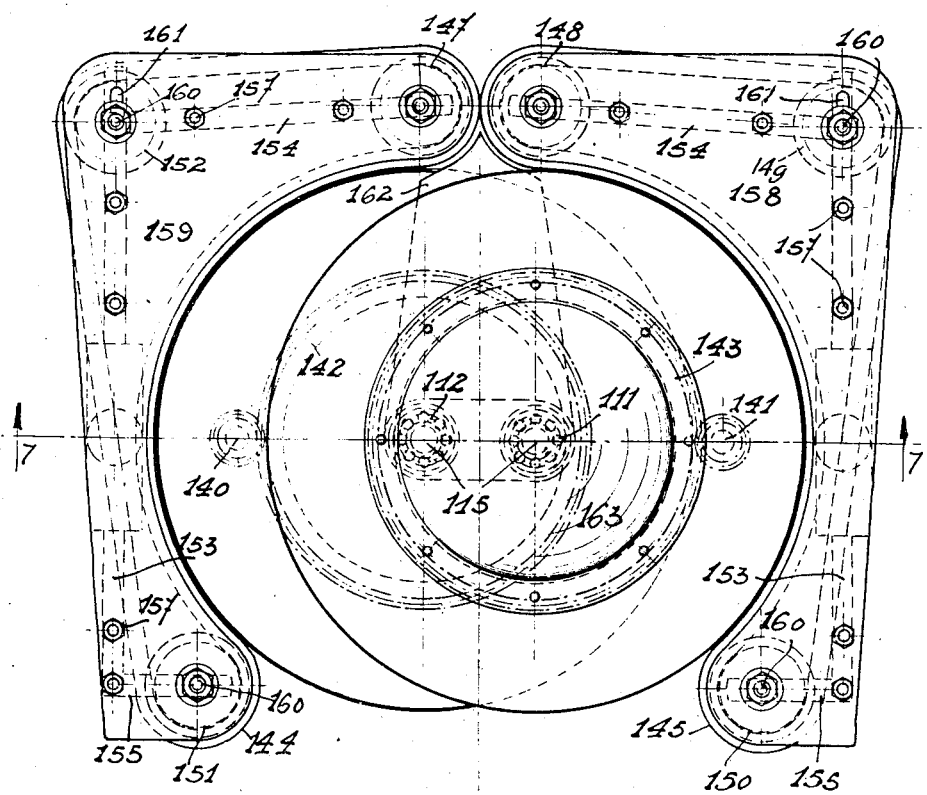
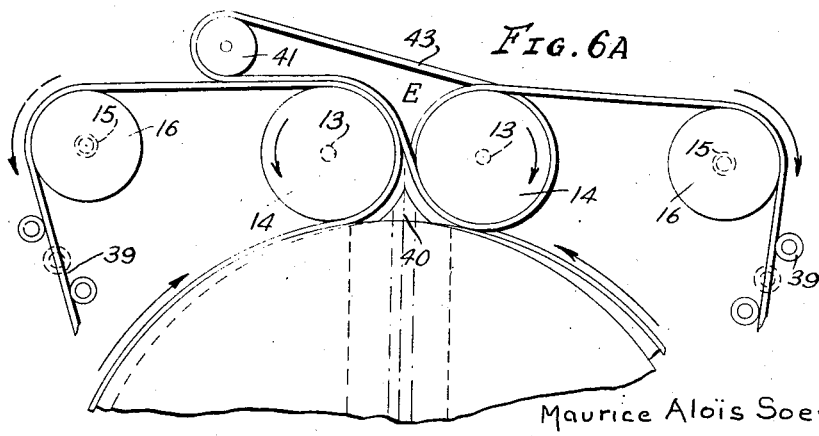

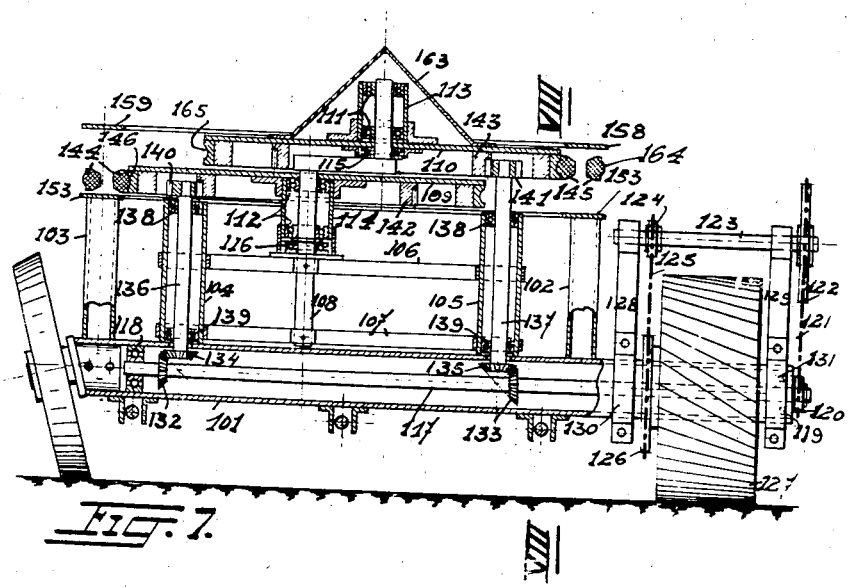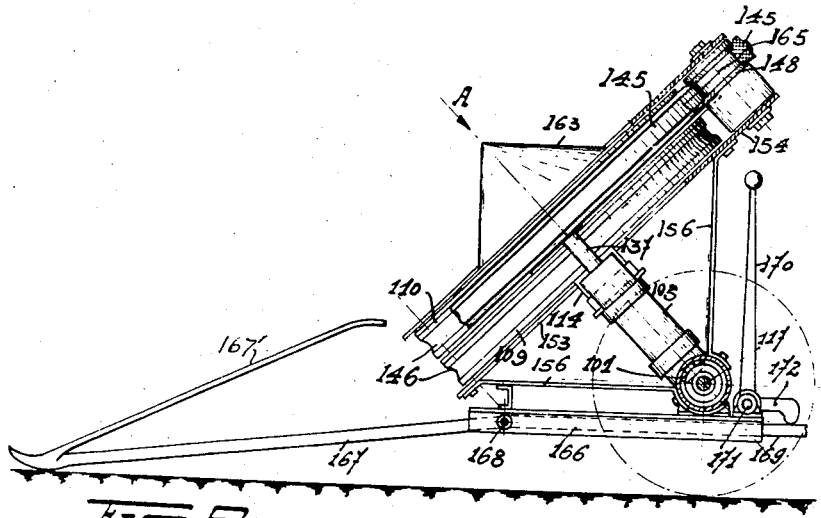

Patented Dec. 19, 1939

2,183,946

UNITED STATES PATENT OFFICE 2,183,946

MACHINE FOR PULLING STANDING FLAX OR OTHER LIKE PLANTS

Maurice Alois Soenens, Bruges, Belgium, assignor to The Automatic Flax Production Units, Courtrai, Belgium, a corporation of Belgium Application July 23, 1937, Serial No. 155,207
In Belgium July 30, 1936

11 Claims. (Cl. 55—66)

My present invention relates to a machine for pulling standing flax or other like plants.

It has for its object to increase considerably the efficiency of existing machines and so to arrange matters that two bands of stalks may be pulled simultaneously by each pulling element, and that these bands may be forwarded in sheets, one on each side of the element, to the rear where they are conveyed to the outlet in a single sheet.

With this object in view, the invention essentially consists in the special arrangements and combinations of parts hereinafter fully described and pointed in the appended claims.

On the annexed drawings which show by way of example how the invention may be carried into practical effect:

Figures 1 to 6 relate to a first construction.

Figure 1 is a section in side elevation of the machine.

Figure 2 is a plan view of the whole seen in the direction of the arrow A in Figure 1.

Figure 2A shows a part of Figure 2 together with an attachment which may be used with the device of the present invention.

Figure 3 is a section view showing the mounting of the plates of one element.

Figure 4 is a view of the machine seen in the direction of the arrow B in Figure 1.

Figure 5 is a diagrammatic view showing the operation of the pulling plates.

Figure 5A shows a part of the device illustrated in Figure 5 together with an attachment which may be used according to a modified form of the invention.

Figure 6 is a view of a pulling element.

Figure 6A shows a part of Fig. 6 together with an attachment according to a modified form of the invention.

Figures 7 to 9 relate to a second construction.

Figure 7 is a section view,

Figure 8 is a section on line VIII—VIII in Figure 7 and

Figure 9 is a plan view.

Referring to these drawings (Figures 1 to 6), 1 denotes the wheels of the machine carried by arms 2 integral with a cross-member 3. The latter is extended on one side of the machine by a girder 4 serving for the attachment of the pole 5 and supporting a driving element 6, for example a petrol motor. Extending parallel to the cross-member 3 is a cross-member 7 connected to the cross-member 3 by braces 8. The assemblage 3—7—8 occupies an inclined position relatively to the ground (Fig. 1).

The cross-member 3 serves as support for shafts 9 carrying plates 10 and each terminating in a crank 11 supporting in its turn a plate 12 (Figure 3), so that each plate 12 is offset relatively to a plate 10 (Figure 5).

The cross-member 7 carries spindles 13 for pulleys 14 and spindles 15 for pulleys 16. The pulleys 14 and spindles 13 are arranged in pairs between two pulleys 16 and two spindles 15.

All the spindles 13—15 are surrounded by a metal bushing 17 for preventing the flax from winding itself round these spindles. The bushings 17 are connected together by cross-members 18 and on their part, the spindles 13—15 are connected together at their upper ends by cross-members 19. The cross-members 18, 19 are formed of sections so as to leave spaces 20 between the pulleys 14 for the passage of the flax.

Extending in the cross-member 7 is a driving shaft 21 provided with bevel pinions 22 meshing with bevel pinions 23, with which the lower end of each of the spindles 13 is provided.

The shaft 21 is supported by bearings 24 and the whole is enclosed in a casing 25. At its end, the shaft 21 carries a sprocket wheel 26 for enabling it to be driven by the motor 6.

Mounted on the cross-members 18—19 are arms 27—28 carrying pulleys 30 through the medium of small arms 29.

The arms 27—28 are secured to the cross-member 3 by braces 31.

Co-operating with each pair of plates is an element for separating the stalks of flax constituted by a bar or rod 32, tapered at its end and fixed to the cross-member 3.

Said bar 32 serves for the attachment, for example by welding, of guides 33 inclined relatively to the bars 32 and connected to the pins 11 by a curved portion 34.

Rods 35, likewise for separation, are also fixed to the cross-member 3, but at the place of the arms 27—28, and likewise carry inclined guides 36 connected to the bars 27.

As shown more particularly in Figure 6, two belts co-operate with each element of the machine comprising two plates 10—12:

(1) A belt 37 passing over a pulley 16, a pulley 14, a part of the periphery of the upper plate 12 and a pulley 30.

(2) A belt 38 likewise passing over a pulley 16, a pulley 14, a part of the periphery of the lower plate 10 and a pulley 30.

Each of these belts may be provided with a roller tensioning device 39 and any desired system of guiding.

Considering a single element represented in

Figure 6, it will be appreciated that, by the forward movement of the machine (Figure 6), the flax stalks to be pulled are separated into two bands A—B of about 0.40 metre each by the dividing or separating members 32—33 on the one hand and 35—36 on the other. The stalks are then conducted towards the throats C and D formed by the meeting of the belts 37—38 and plates 10—12.

At the point C, that is to say, at the throat formed by the meeting of the belt 37 and upper plate 12, the flax is seized and pressed against the rim of the plate by the belt 37. Due to the backward rotation of the inclined plate 12, the stalks are pulled up and conveyed towards the rear of the machine.

The same thing occurs at the point D, that is to say the throat formed by the meeting of the belt 38 and lower plate 10, which rotates in the opposite direction to the plate 12.

Thus, two bands of stalks are pulled and conveyed in sheets, one on each side of the element, towards the rear where a guide 40 interposed between the two plates 10—12 and fixed to the central shaft 9 conducts them in a single sheet towards the outlet E.

As shown in Figures 2, 3, 5, it is possible to arrange any number of these elements side by side. The machine thus constructed possesses numerous advantages. It is admirably suitable for the retting of the flax on the ground, due to the fact that each element pulls the stalks up over a width of ground of 0.80 metre, that is, much larger than with existing machines, thus clearing just the area necessary for the ground retting of the flax, which then measures 0.80 metre and is pulled up and laid transversely in the rear. Furthermore, the machine delivers the stalks pulled on each side in a single, continuous parallel sheet, the feet being on the same line.

In the case of retting on the ground, each outlet E may be provided with a device for bringing the flax into an appropriate position for spreading it on the ground.

This device, which is illustrated in Figures 2A, 5A and 6A, comprises a pulley 41 mounted on supports 42 and carrying a belt 43 likewise passing over one of the pulleys 14 of each element. A curved metal sheet 44 permits the fall of material to be guided.

The object of the movability of the pulleys 30 and arms 29 is to prevent the fracture of member if a stone or other like object were to become wedged between the belts 37 and 38 and the plates 10—12.

Of course, the foregoing details have been given purely by way of example and numerous modifications may be introduced without departing from the invention. Thus, the machine may be drawn by animal or by tractor.

Figures 7, 8 and 9 relate to a modification, the object of which is to simplify considerably the construction of the machine and at the same time to render it more robust, lighter and less bulky, so that it may be readily fitted in place of the cutters to the chassis of a harvester-binder or mowing machine. In this construction, the frame of the machine comprises a tube 101, generally of steel, surmounted by two tubes 102 and 103 situated at the ends of the chassis, and two tubes 104 and 105 situated between the tubes 102 and 103. The tubes 104 and 105 are connected by braces 106 and 107 serving as supports for a fixed cranked shaft 108, on which rotate the plates 109 and 110 by means of ball bearings 111 and 112 mounted in bushes 113 and 114. In addition, each plate rests on ball bearings 115 and 116.

Extending in the interior of the tube 101 is a driving shaft 117 supported at its ends in ball bearings 118 and 119 and driven by a sprocket pinion 120, a chain 121, a sprocket wheel 122, transmission shaft 123, sprocket pinion 124, chain 125, sprocket wheel 126 integral with the driving wheel 127 mounted freely on the tube 101 by means of roller bearings. The shaft 123 is carried by two supports 128 and 129 fixed to the tube 101 by clips 130 and 131.

The shaft 117 carries bevel pinions 132 and 133 meshing with bevel pinions 134 and 135 fixed to the ends of vertical shafts 136 and 137 extending respectively in the tubes 104 and 105 and rotating in ball bearings 138 and 139.

At their upper ends, the shafts 136 and 137 carry toothed pinions 140 and 141 meshing with ring gears 142 and 143 with which are provided the plates 109 and 110.

As usual, co-operating with the plates 109 and 110 are belts 144 and 145 passing over the rims 146 of the plates 109 and 110 and also over guide pulleys 147, 148, 149, 150, 151, 152.

The tubes 102 and 103 support plates 153 extending laterally relatively to the plates 109 and 110 and slightly below the lower plate 109. Integral with plates 153 are plates 154 extending in a direction substantially at right-angles relatively to the plates 153. In front, the plates 153 are likewise extended by plates 155.

The assemblage 153—154—155 is connected to the tube 101 by rods 156 and carries by means of braces 157 plates 158 and 159 which, internally, conform to a part of the periphery of the plates 109 and 110 and are slightly above the plate 110.

Between the plates 153—154—155 and plates 158 and 159 are located the pulleys 147, 148, 149, 150, 151, 152 which rotate in ball bearings on the braces 160 provided with bushes.

The spindles of the pulleys 149 and 152 are mounted in slots 161 for adjusting the tension of the belts 144 and 145.

The machine is completed by a guide plate 162 placed between the plates 109 and 110 and also by a cone 163 fixed to the upper plate 110 for protecting the bearing elements of the latter.

Due to this arrangement, the construction of the machine is considerably simplified. In addition, it is capable of working in any weather, on any ground and with a staff unskilled in engineering, these qualities resulting from the lightness, simplicity and robustness of the machine, and also from the fact that all the gears and bearing members are protected.

It should be remarked that, preferably, in a machine of this type, belts of trapezoidal form will be employed, which will facilitate their engagement in the grooves of the pulleys. In addition, they possess a convexity 164 co-operating with a groove 165 with which the rim 146 of the plates 109 and 110 is provided.

In addition, the tube 101 may be provided with supports 166 leaving a space between them in which are lodged lifting bars 167 each oscillating about a pivot 168 and extended rearwardly by bars 169 projecting from the supports 166, and on which it is possible to act by means of a lever 170 integral with a control rod 171 provided with nose pieces 172, enabling the simultaneous lifting of the bars 167 and 169 to be controlled when the necessity arises. Elements 167' are rigidly mounted on bars 167 (Fig. 8)

and correspond to guides 33, 36 of the first form of construction described above.

It should furthermore be remarked that the arrangement described in Figures 7, 8 and 9, more particularly regarding the arrangement of the tubes 102, 103, 104 and 105 may be applied equally well in the case of a pulling machine having two pulling plates as in that of a machine having only one pulling plate (in the present case the plate 109). The dot-and-dash line 7—7 in Fig. 9 indicates that Fig. 7 is a section on line 7—7, looking in the direction of the arrows.

In addition, the machine described is equally suitable for traction by means of horses as in the case in which a separate motor is employed for driving the mechanism.

What I claim is:

1. In a machine for pulling standing flax and other like plants from the field in combination with a frame adapted to be moved across the field, a hollow horizontal tube on said frame, a driving shaft rotating in the said hollow tube, two vertical tubes fixed to the said horizontal hollow tube at either end of the frame and two other tubes fixed to the horizontal tube and situated between the two other vertical tubes, means connecting the intermediate vertical tubes, a fixed cranked shaft supported by the said latter means, two pulling plates carried by the said cranked shaft, means whereby the said pulling plates are rotated, and pulling belts cooperating with the said pulling plates.

2. In a machine for pulling standing flax and other like plants from the field in combination with a frame adapted to be moved across the field a horizontal tube on said frame, two vertical tubes fixed to the horizontal tube, one at each of the extremities of the said horizontal tube, two other vertical tubes also fixed to the said horizontal tube, braces connecting the two intermediate tubes, a fixed cranked shaft carried by said braces, two pulling plates mounted on the said cranked shaft and being transversely offset relatively to one another, pulleys supported by the outer vertical tubes, two belts, each of the said belts passing on said pulleys and on a portion of the periphery of one pulling plate and, means whereby the plates are adapted to be rotated in opposite directions.

3. In a machine for pulling standing flax and other like plants from the field, in combination with a frame adapted to be moved across the field a horizontal hollow tube on said frame, a driving shaft extending in the latter, four vertical tubes fixed to the said horizontal tube, braces connecting the two intermediate tubes, a fixed cranked shaft carried by said braces, two pulling plates mounted on the said cranked shaft and being transversely offset relatively to one another, pulleys, two belts, each of the latter passing on said pulleys and on a portion of the periphery of one pulling plate, means whereby the plates are rotated in opposite directions from the driving shaft, two of the tubes containing secondary shafts for driving the pulling plates and two others supporting said pulleys for the belts.

4. In a machine for pulling standing flax and other like plants from the field, in combination with a frame adapted to be moved across the field a horizontal hollow tube on said frame, a driving shaft extending in the latter, four vertical tubes fixed to the said horizontal tube, braces connecting the two intermediate tubes, a fixed cranked shaft carried by said braces, two pulling plates mounted on the said cranked shaft and being transversely offset relatively to one another, pulleys, two belts, each of the latter passing on said pulleys and on a portion of the periphery of one pulling plate, means whereby the plates are rotated in opposite directions from the driving shaft, two of the tubes containing secondary shafts for driving the pulling plates and two others supporting said pulleys for the belts, pinion gears on the lower faces of said pulling plates, and corresponding pinions on the upper ends of said secondary shafts in engagement with said pinion gears.

5. In a machine for pulling standing flax and other like plants from the field, in combination with a frame adapted to be moved across the field a horizontal hollow tube on said frame, a driving shaft extending in the latter, four vertical tubes fixed to the said horizontal tube, braces connecting the two intermediate tubes, a fixed cranked shaft carried by said braces, two pulling plates mounted on the said cranked shaft and being transversely offset relatively to one another, pulleys, two belts, each of the latter passing on said pulleys and on a portion of the periphery of one pulling plate, means whereby the plates are rotated in opposite directions from the driving shaft, two of the tubes containing secondary shafts for driving the pulling plates and two others supporting said pulleys for the belts, pinion gears on the lower faces of said pulling plates, corresponding pinions on the upper ends of said secondary shafts in engagement with said pinion gears, fixed plates supported on said vertical tubes, and pairs of cover plates connected to said fixed plates and conforming to the pulling plates over part of their periphery, said pulleys being arranged between pairs of cover plates.

6. In a machine for pulling standing flax and other like plants from the field, in combination with a frame adapted to be moved across the field a horizontal hollow tube on said frame, a driving shaft extending in the latter, four vertical tubes fixed to the said horizontal tube, braces connecting the two intermediate tubes, a fixed cranked shaft carried by said braces, two pulling plates mounted on the said cranked shaft and being transversely offset relatively to one another, pulleys, two belts, each of the latter passing on said pulleys and on a portion of the periphery of one pulling plate, means whereby the plates are rotated in opposite directions from the driving shaft, two of the tubes containing secondary shafts for driving the pulling plates and two others supporting said pulleys for the belts, the belts having a trapezoidal form.

7. In a machine for pulling standing flax and other like plants from the field, in combination with a frame adapted to be moved across the field a horizontal hollow tube on said frame, a driving shaft extending in the latter, four vertical tubes fixed to the said horizontal tube, braces connecting the two intermediate tubes, a fixed cranked shaft carried by said braces, two pulling plates mounted on the said cranked shaft and being transversely offset relatively to one another, pulleys, two belts, each of the latter passing on said pulleys and on a portion of the periphery of one pulling plate, means whereby the plates are rotated in opposite directions from the driving shaft, two of the tubes containing secondary shafts for driving the pulling plates and two others supporting said pulleys for the belts, the belts having a trapezoidal form and a convexity cooperating with grooves provided in the rims of said pulling plates.

8. In a machine for pulling standing flax or other like plants from the field, a frame adapted to be moved across the field, two superimposed plates mounted on said frame for rotation in opposite directions about transversely offset axes, and two continuously revolving belts arranged for cooperation with the revolving surfaces of said plates, respectively, the surfaces of each belt and its corresponding plate converging over parts of their paths to form a throat for grasping the plants and traveling in elastic contact with each other over subsequent parts of their paths to pull the grasped plants from the field and transport them through the machine.

9. A machine, as claimed in claim 8, in which said frame comprises a cross member carrying transversely offset fixed shafts, said superimposed plates being supported freely rotatable on said shafts.

10. A machine, as claimed in claim 8, in which said frame comprises a cross-member, carrying a fixed shaft on which the lower one of said superimposed plates is freely rotatably mounted, said shaft terminating in a fixed crank rotatably supporting the upper one of said superimposed plates in a position transversely offset with respect to said lower plate.

11. A machine, as claimed in claim 8, in which said frame comprises a cross member, spindles carried by said cross member, and pulleys for said belts mounted on said spindles.

MAURICE ALOIS SOENENS.